(12) United States Patent
Rancien et al.

(10) Patent No.: US 8,144,016 B2
(45) Date of Patent: *Mar. 27, 2012

(54) STRUCTURE INCLUDING AN ELECTRONIC DEVICE, IN PARTICULAR FOR FABRICATING A SECURITY DOCUMENT OR A DOCUMENT OF VALUE

(75) Inventors: Sandrine Rancien, La Murette (FR); Frederic Vicentini, Sucy En Brie (FR)

(73) Assignee: Arjowiggins Security, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/923,753

(22) Filed: Oct. 6, 2010

(65) Prior Publication Data

US 2011/0025505 A1 Feb. 3, 2011

Related U.S. Application Data

(62) Division of application No. 11/578,520, filed as application No. PCT/US2005/050240 on Apr. 14, 2005, now Pat. No. 7,872,579.

(30) Foreign Application Priority Data

Apr. 14, 2004 (FR) ...................................... 04 03908

(51) Int. Cl.
*G08B 13/14* (2006.01)
(52) U.S. Cl. ............. 340/572.1; 340/572.9; 340/870.09; 340/5.86

(58) Field of Classification Search .... 340/572.1–572.9, 340/870.09, 511, 5.4, 5.52, 5.54, 5.86
See application file for complete search history.

(56) References Cited

U.S. PATENT DOCUMENTS

| | | | |
|---|---|---|---|
| 4,428,997 A | 1/1984 | Shulman | |
| 4,551,909 A * | 11/1985 | Cogan et al. | 438/192 |
| 5,216,269 A * | 6/1993 | Middelhoek et al. | 257/318 |
| 5,528,222 A | 6/1996 | Moskowitz et al. | |
| 5,847,373 A * | 12/1998 | Catte | 235/492 |
| 6,108,205 A * | 8/2000 | Bergstedt | 361/704 |
| 6,190,942 B1 | 2/2001 | Wilm et al. | |
| 6,233,818 B1 | 5/2001 | Finn et al. | |
| 6,305,609 B1 | 10/2001 | Melzer et al. | |
| 6,406,935 B2 | 6/2002 | Kayanakis et al. | |
| 6,830,192 B1 * | 12/2004 | Krul et al. | 235/492 |
| 2002/0056855 A1 | 5/2002 | Reiner | |

(Continued)

FOREIGN PATENT DOCUMENTS

DE   196 54 902 A1   10/1997

(Continued)

OTHER PUBLICATIONS

Dec. 21, 2011 European Search Report in European Application No. EP 10 17 6339 (with English Translation).

*Primary Examiner* — Daniel Previl
(74) *Attorney, Agent, or Firm* — Oliff & Berridge, PLC

(57) ABSTRACT

A structure for use in fabricating a security document or a document of value is provided. The structure includes an electronic device, an inset layer made at least in part out of fiber, a window within which the electronic device extends, at least in part, and an adhesive layer in contact with the inset layer.

8 Claims, 8 Drawing Sheets

U.S. PATENT DOCUMENTS

| | | |
|---|---|---|
| 2002/0190132 A1 | 12/2002 | Kayanakis |
| 2003/0136503 A1 | 7/2003 | Green et al. |
| 2003/0168514 A1 | 9/2003 | Rancien et al. |
| 2003/0179495 A1 | 9/2003 | Smith et al. |
| 2003/0214794 A1 | 11/2003 | Takahashi et al. |
| 2004/0157054 A1 | 8/2004 | Rancien |
| 2005/0060637 A1 | 3/2005 | Rietzler |
| 2005/0116462 A1 * | 6/2005 | Telleen .................. 283/56 |
| 2005/0230960 A1 | 10/2005 | Bilodeau et al. |
| 2005/0230966 A1 | 10/2005 | Trantoul et al. |

FOREIGN PATENT DOCUMENTS

| | | |
|---|---|---|
| DE | 10 2004 008 841 A1 | 9/2004 |
| EP | 0950537 * | 4/1999 |
| EP | 1 211 634 A2 | 6/2002 |
| EP | 1 517 267 A1 | 3/2005 |
| FR | 2 840 431 A1 | 12/2003 |
| GB | 2 279 907 A | 1/1995 |
| WO | WO 98/02848 A1 | 1/1998 |
| WO | WO 98/15916 | 4/1998 |
| WO | WO 00/26855 A1 | 5/2000 |
| WO | WO 00/42569 A1 | 7/2000 |
| WO | WO 01/41061 A1 | 6/2001 |
| WO | WO 01/45040 A2 | 6/2001 |
| WO | WO 02/082126 A1 | 10/2002 |
| WO | WO 02/089052 | 11/2002 |
| WO | WO 2004/049247 A1 | 6/2004 |
| WO | WO 2004/080726 A2 | 9/2004 |
| WO | WO 2005/034031 A1 | 4/2005 |
| WO | WO 2005/057483 A1 | 6/2005 |
| WO | WO 2005/062246 AI | 7/2005 |

* cited by examiner

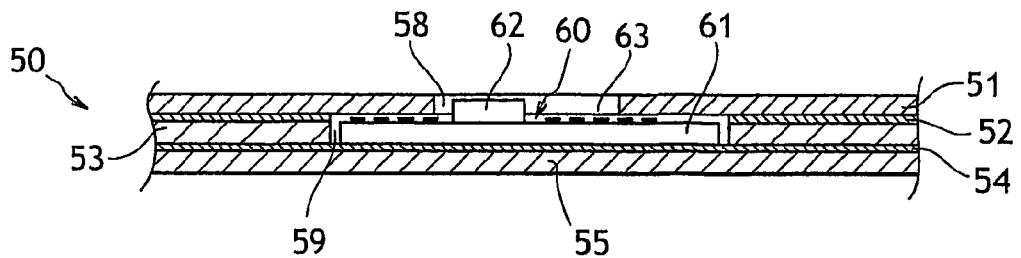
FIG.11
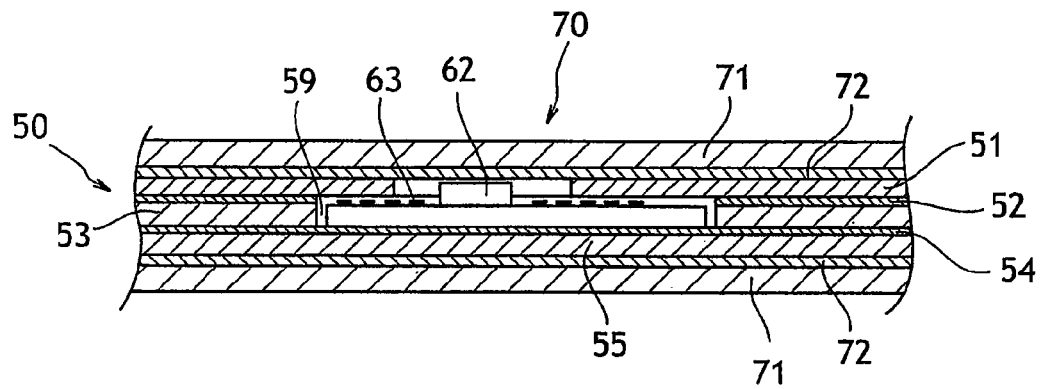
FIG.12
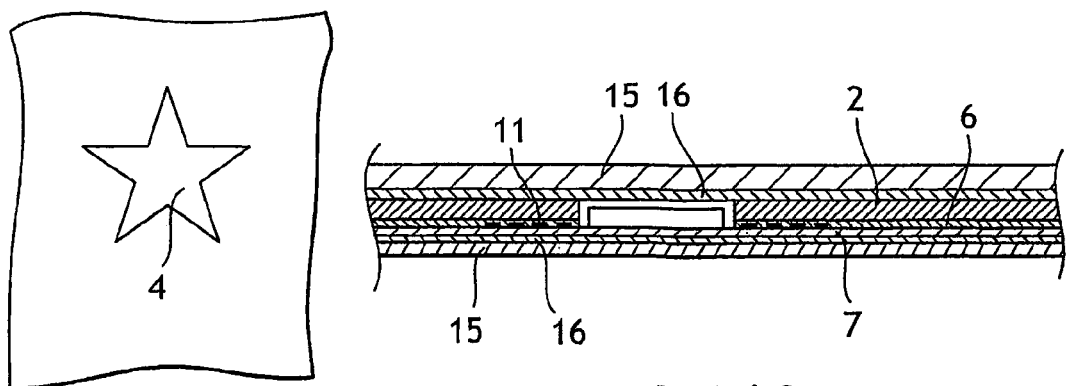
FIG.13
FIG.16

STRUCTURE INCLUDING AN ELECTRONIC DEVICE, IN PARTICULAR FOR FABRICATING A SECURITY DOCUMENT OR A DOCUMENT OF VALUE

BACKGROUND

This is a Division of application Ser. No. 11/578,520 filed Jun. 1, 2007, which in turn is a PCT of Application No. PCT/FR2005/050240, filed Apr. 14, 2005. The disclosures of the prior applications are hereby incorporated by reference herein in their entirety.

The present invention relates to a structure including an electronic device, e.g. a radio frequency identification device (RFID), in particular for fabricating a security document or a document of value or for making an article secure. The electronic device may enable data to be exchanged without contact.

The term "making an article secure" is used to mean providing an article, e.g. constituted by a packaging device, with an electronic device capable of serving to prevent theft, or to act as authentication or tracing means, for example.

Patent application GB 2 279 907 discloses a smart card made by assembling bottom and top layers with a central structure carrying an electronic device which comprises an integrated circuit and a coil connected to the circuit. In order to make the central structure, the electronic device is sandwiched between polyester layers, each covered on one face in a thermally-activatable adhesive. The central structure is itself sandwiched between bottom and top layers of polyvinyl chloride (PVC). The layers constituting the central structure are assembled with the electronic device and the central structure is assembled with the bottom and top layers during fabrication of the card. Under the action of pressure and temperature, the electronic device is pressed into the adjacent layers, thereby compensating for its thickness, while the various layers are bonding together. That patent application does not describe a preassembled central structure.

U.S. Pat. No. 6,305,609 discloses a smart card made by assembling together bottom and top layers with a central structure carrying an electronic device. The central structure comprises a support film carrying the electronic device which comprises an integrated circuit and a coil connected to the circuit. The device projects from both sides of the support film. The projecting portions are compensated in thickness by a thermoplastic liquid that is cross-linked under UV radiation. The liquid is inserted at the last moment during assembly of the central structure with the above-mentioned bottom and top layers. These layers and the support film are made of thermoplastic material. That type of central structure that presents extra thicknesses requires special equipment for final assembly in the card, or for example between bottom and top layers that are made of fiber, for example.

U.S. Pat. No. 6,233,818 discloses a smart card made by assembling together bottom and top layers with a central structure carrying an electronic device. The central structure comprises a support film of thermoplastic material with a window within which the electronic device is placed, which device comprises a module with an integrated circuit and a copper coil that is connected to the circuit and inserted at the surface of the film using an ultrasound method. The film is made of PVC, polycarbonate (PC), or modified polyethylene terephthalate (PET-G), and is then directly laminatable with printed bottom and top layers to fabricate the smart card using special equipment that generates pressure and temperature.

Such a structure is difficult to handle since the antenna is flush on the structure.

In addition, that type of structure is not adapted to being integrated directly between the cover of a passport and its booklet of sheets, for example, since the book-binding adhesives presently in use are applied in cold and in liquid form.

Patent application WO 00/42569 discloses a label made by depositing the following layers in succession on paper covered in silicone:

a layer of adhesive that can be cross-linked under the effect of UV radiation; a layer of an electrically conductive material forming connection tabs;

a layer of dielectric material;

a layer of a conductive metallic ink for forming an antenna; and an expandable layer containing a polymeric resin and including a window.

The electronic device is inserted in the window of the expandable layer in contact with the antenna. In that application, there is no preassembled central structure. The expandable layer includes a cavity in the vicinity of the chip to avoid excess thickness. With a label made in that way, it is relatively easy to peel the label from its support after it has been applied thereto, and without leaving evidence of falsification. Finally, such a construction does not serve to hide the electronic device, i.e. the chip and its antenna, when observed using transmitted light.

International application WO 02/089052 describes a passport in which the cover is provided with a radiofrequency identification device.

That cover may comprise a first sheet carrying the radiofrequency device, a second sheet provided with a hole, and a third sheet of paper, the sheets being stuck together and the chip being received in the hole.

International application WO 02/082126 describes a sticky document including an electronic chip connected to an antenna. The antenna is made by printing a conductive ink on an adhesive layer.

The supplier SMARTRAC sells structures known as "prelaminated inlays" comprising layers of polycarbonate or PET, that are to be integrated in a security document. The supplier AONTEC also sells structures known as "prelaminated inlays" for being laminated with layers of a security document, those structures comprising layers of PVC or PC.

Those structures are not entirely satisfactory in terms of security, or in terms of assembly with bottom and top fiber layers.

SUMMARY

In one of its aspects, the invention seeks in particular to provide a structure including an electronic device that makes any attempt at falsifying an article or a security document or a document of value including such a structure more difficult or even impossible, and that is also easy to assemble with the article or the remainder of the document.

The invention thus provides a structure, in particular for fabricating a security document or a document of value or for making an article secure, the structure comprising:

an electronic device;

an inset layer preferably made at least in part out of fiber, and having a window within which the electronic device extends, at least in part; and an adhesive layer in contact with the inset layer. The adhesive layer may serve, for example, to assemble the inset layer with an adjacent layer of the structure or with an adjacent layer of a security document or of a document of value in which the structure is integrated, or it may serve to secure the structure to an article.

The inset layer may be white or colored.

Preferably, the adhesive presents adhesive power and coherence that are sufficiently strong for any attempt at separating the inset layer from the above-mentioned adjacent layer to spoil at least the inset layer.

By way of example, the structure of the invention can be used for making an identity document, e.g. a passport, or a visa label.

The term "electronic device" is used to designate any device enabling information to be stored and/or exchanged, in particular over a wireless connection. The electronic device may be constituted in particular by an RFID. The electronic device may include an antenna, e.g. in the form of a coil of wire or printing. The electronic device may optionally include electrical contacts that are visible from outside the structure.

By means of the invention, the structure need not have any perceptible extra thickness, if so desired, it being possible for the electronic device to be received entirely in the window in the inset layer. Thus, the structure can easily be assembled, as desired, with various types of security document, without being provided with any special element to compensate for the thickness of the electronic device, as is necessary, for example, for the smart card described in above-mentioned U.S. Pat. No. 6,305,609.

The structure of the invention also presents the advantage that any attempt at falsifying it turns out to be relatively difficult, if not impossible, since the inset layer is easily spoilt when attempting to peel the structure apart, which is not necessarily the case for a security document or a document of value made with a central structure of the kind described for example in U.S. Pat. No. 6,233,818 or in application WO 00/42569.

In addition, because the electronic device is housed at least in part in a window in the inset layer, the electronic device is protected against mechanical impacts.

The above-mentioned adjacent layer of the structure is constituted, for example, by an additional inset layer, a masking layer, or a support of the electronic device, this list not being limiting.

When the structure is for fabricating a label, e.g. a visa label, the above-mentioned adhesive layer is advantageously covered in a removable protective anti-adhesive film.

In a particular embodiment, the structure includes at least one outer fiber layer for assembly with a fiber layer of the security document or document of value.

Thus, the structure can be assembled with at least one fiber layer of the security document or document of value in relatively easy manner, in particular without using any special adhesive, nor setting up special conditions for lamination purposes such as those usually to be encountered in fabricating smart cards (lamination time 30 minutes (min) at 150° C.), and while limiting problems of curl since the fiber layers of the structure and of the document that are to be assembled together are of natures that are similar or compatible.

Advantageously, the inset layer is made entirely out of fiber, which can make it easier, for example, to incorporate security elements therein and which can also make it easier for it to become delaminated in the event of an attempt at falsification.

In an embodiment of the invention, at least one of the nature and the thickness of the inset layer is selected in such a manner that the inset layer is opaque in transmitted light. Thus, when the structure is observed in transmitted light, the inset layer can serve to mask the electronic device, at least in part.

The inset layer may also be arranged to reflect light, thus also making it possible to mask the electronic device, at least in part, when the structure is observed in reflected light or in transmitted light.

As mentioned above, the inset layer may be white, or in a variant it may be colored. The inset layer may include a colored core with a white coating.

When the inset layer is colored, the dye(s) and/or pigment(s) present in the inset layer is/are preferably retained in the inset layer with sufficient force to avoid any migration thereof into the adjacent layers of the structure and/or the security document or document of value on which the structure is assembled.

The inset layer may be metallized or laminated with at least one metal film, which can serve to make it opaque while taking care to avoid disturbing the read/write operation of the electronic device.

The window preferably passes through the inset layer, however in a variant the window is not a through window.

In an embodiment of the invention, the structure is arranged so as to make it possible visually, optionally under special lighting, or with the help of a detector device, to detect on the security document or document of value and through the window in the inset layer, a security element carried by the structure, said security element possibly being present in particular on the electronic device, e.g. in the form of an inscription or a coating, such as a varnish coating, for example. By way of example, the structure may include a thermochromic coating that is detectable on the security document or document of value through the window.

The structure, and in particular at least one of the inset layer, an optional masking layer, and the adhesive layer, preferably includes at least one of the following security elements: an authentication element; and an element for revealing falsification, said security element(s) being visible and/or detectable with the help of a detector device.

The structure, and in particular, at least one of the inset layer, an optional masking layer of the structure, and the adhesive layer, advantageously includes at least one security element selected from: an element having a variable and/or diffractive optical effect such as, for example a holographic, iridescent, or liquid crystal element; a magnetic or crystal coating; magnetic fibers; tracers detectable by magnetic resonance; tracers detectable by X-ray fluorescence; printing using a varnish or an ink; luminescent or fluorescent tracers; and compounds that are photochromic, thermochromic, electroluminescent, and/or piezochromatic, and/or that change color on coming into contact with one or more predetermined chemicals, in particular acids, bases, oxidizers, or solvents.

Advantageously, the window and/or the inset layer present a shape imitating an image, a logo, or an inscription, so as to define additional security for the structure and the document fitted with the structure. The window may thus present a shape that is not rectangular, for example.

In an implementation of the invention, the electronic device comprises a support carrying an electronic chip and an antenna connected to the electronic chip, the electronic chip extending at least in part in the window of the inset layer. The antenna enables electricity to be fed to the electronic chip and enables data to be read from and/or written to the chip without contact. The chip may comprise one or more insulated circuits, and in particular a memory.

The support may be flexible. The support may be based on a material that is organic or inorganic, natural or synthetic, e.g. it may be a fiber layer, in particular a layer of paper.

The support may also be made for example out of a material containing a polymer, in particular PET. In a variant, the support may be made of PVC, ABS/PC, PC, PA, polyimide, PE, PP, or epoxy glass, this list not being limiting.

The electronic chip secured on the support may optionally be encapsulated in a resin. The antenna may be of the wire type, or it may be etched, printed, or made by stamping, or indeed by using an electrolytic growth method. The antenna may extend at least in part over the chip. When the antenna is made of wire, it is advantageously held by a layer of an adhesive, which may also serve to assemble together two layers of the structure. The adhesive layer then advantageously presents thickness that is greater than that of the wire of the antenna.

On one of its faces, the support may include a coating containing a security element, such as, for example: an irreversible thermochromic compound that changes color, e.g. passes from being colorless to having a predefined color, e.g. pink or red, when the temperature exceeds a predefined value, e.g. about 65° C. This can serve to reveal a thermal attack on the structure.

In an embodiment of the invention, the support is sandwiched between two layers of the portion. Under such circumstances, the structure may have a single inset layer.

In a variant, the structure may include at least one additional inset layer having at least part of the support of the electronic device housed therein. By way of example, the device may comprise a module with a connection portion for connection to an antenna and an electronic chip embedded in an encapsulating resin.

The additional inset layer may include a window housing the connection portion of the module, at least in part, with the encapsulating resin being housed in the window of the other inset layer. The antenna of the electronic device may be carried, where appropriate, by this additional inset layer.

In a variant, the electronic device may be coupled to a second antenna that plays an amplifying role, e.g. by increasing range, with the second antenna possibly being carried, where appropriate, by the additional inset layer or by an adjacent layer.

When the structure includes a plurality of inset layers each having a window, the various windows may present shapes and dimensions that are different, for example in order to adapt to the shape of the electronic device. This can increase the protection of the device against impacts.

When the structure has two inset layers, one of them may include a window that is smaller than the window in the other inset layer.

In particular when it constitutes a module, the electronic device may comprise portions of different width, the portion with the smaller width being received in the smaller window and the portion with the greater width being received in the larger window.

The inset layer with the smaller window may present thickness substantially equal to the thickness of the portion of the electronic device having the smaller width, and likewise the inset layer with the larger window may present thickness substantially equal to the distance of the portion of the electronic device having the greater width.

The electronic device may include an antenna disposed between the two inset layers, e.g. an antenna that is etched or made of wire. The electronic device may in particular include an antenna that is placed its portion of greater width.

The adhesive used between the two inset layers need not be a pressure-sensitive adhesive, thus making it easier to position the two inset layers accurately relative to each other. For example, it is possible to hold the two layers together temporarily by melting spots in a layer of hot-activatable adhesive present between the two layers, e.g. by localized application of ultrasound prior to final assembly.

In a variant, the windows in the two layers are identical in size.

The structure may present a maximum thickness of about 500 micrometers (μm), for example.

In an embodiment of the invention, the structure includes at least one masking layer located at least over a window of an inset layer so as to mask the electronic device at least in part when the structure is observed in transmitted light and/or in reflected light. The structure can thus present increased security against counterfeiting, making an attempt at reproducing the structure more difficult.

The masking layer may be white or colored. The masking layer may comprise a colored core with a white coating.

The masking layer may be metallized or laminated with at least one metallic film.

The masking layer may optionally be a fiber layer.

In an embodiment of the invention, the adhesive layer is selected to enable hot- or cold-assembly of the inset layer to be performed with an adjacent layer of the structure or with an adjacent layer of a security document or a document of value in or on which the structure is to be integrated or secured.

The adhesive may be a thermoplastic or a thermosetting adhesive, an elastomer, or a mixture thereof.

The adhesive may be cross-linked, where appropriate, in order to increase its performance, in particular in terms of mechanical strength or resistance to temperature or to chemicals.

The adhesive may be in solid form when it is a hot-melt adhesive that passes to the liquid state by being heated to act as an adhesive.

In a variant, the adhesive may be in liquid form in a solvent or an aqueous medium, or it may comprise 100% adhesive material.

In yet another variant, the adhesive may be in the form of a film for transferring an adhesive that is sensitive to pressure and/or activatable by applying heat.

A hot-activatable adhesive film that does not present instantaneous adhesion is advantageous for making it easier to position the various layers during fabrication and prior to final assembly.

The adhesive in the form of a film may be reinforced, where appropriate, by a woven or non-woven fiber layer.

By way of example, the adhesive may be hardened by evaporating the solvent or the water, by activating it with a solvent or with heat, by polymerization when the adhesive is chemically reactive, or by cooling when the adhesive is a hot-melt adhesive deposited while hot.

In some circumstances, the materials to be assembled, together with the selected adhesives, are subjected to pressure, with or without added heat, in order to increase the cohesion of the bonding.

By way of example, a hot-activatable adhesive layer may be based on a polymer or a copolymer, for example based on modified polyethylene, on ethylene vinyl acetate, on polybutyl acrylate, on cross-linkable polyurethane, or on a mixture of nitrile rubber and of epoxy resin.

By way of example, a pressure-sensitive adhesive film may be based on cross-linkable or cross-linked acrylic.

By way of example, a liquid adhesive suitable for hardening by evaporation can be based on optionally modified polyurethane or acrylic.

The adhesive layer may be colored in such a manner as to mask the electronic device, at least in part, when the structure is observed in transmitted light and/or reflected light.

Preferably, the adhesion between two adjacent layers of the structure is stronger than the internal cohesion of at least one of said layers. The internal cohesion of a layer corresponds in particular to its ability to withstand internal delamination. Thus, any attempt at separating one of the layers of the structure spoils that layer.

In an embodiment of the invention in which the structure includes two inset layers, one of them presents internal cohesion that is weaker than that of the other inset layer.

The inset layer advantageously presents internal cohesion that is less than or equal to the internal cohesion of the masking layer, if present.

When the electronic device includes a support, the internal cohesion of the support may be less or equal to the internal cohesion of the inset layer. Thus, the structure provides security against attempted falsification by trying to isolate the electronic device by tearing or delaminating between the inset layer and the masking layer or between the inset layer and the support, in particular if the support presents the same dimensions as the inset layer.

The structure may include an anti-adhesive film designed to be removed when the structure is to be stuck onto a document or an article, such as packaging, for example.

The structure may be coated with adhesive layers on each of its two opposite faces. Each adhesive layer may be protected by a respective removable anti-adhesive protection film, in particular when the adhesive is pressure-sensitive. When the adhesive is not pressure-sensitive, for example being hot-activatable, an anti-adhesive film might not be necessary.

In particular when the structure includes an anti-adhesive film for protecting the adhesive layer, the structure may constitute a visa that is to be stuck onto a sheet of a passport.

The structure may include a security element that is visible in its edge.

The presence of a fiber layer, in particular a layer of paper, e.g. an inset layer or a masking layer, at the outside face of the structure is advantageous since such a layer can be compatible with liquid adhesives, in particular water-based adhesives, e.g. those of the kind likely to be used in fabricating passports.

In addition, a fiber layer can be more easily formulated to present low cohesion and be spoilt in the event of an attempt at delaminating the structure or at separating the structure from the cover of a passport with which the structure has been assembled, thereby constituting proof of fraudulent manipulation.

It is also possible to incorporate security elements in the fiber layer.

The fiber layer may be relatively fine, e.g. having density that is less than or equal to 100 grams per square meter ($g/m^2$), and possibly less than or equal to 70 $g/m^2$.

The structure of the invention may be flexible.

In another of its aspects, independently or in combination with the above, the invention also provides a structure, in particular for fabricating a security document or a document of value or for making an article secure, the structure comprising:
 an electronic device; and
 a layer, in particular a fiber layer, including a window within which the electronic device extends, at least part, the window presenting a shape other than rectangular, and in particular a shape imitating an image, a logo, or an inscription, e.g. at least one letter or digit. The layer may be an inset layer as defined above.

In another of its aspects, independently or in combination with the above, the invention also provides a structure, in particular for fabricating a security document or a document of value or for making an article secure, the structure comprising:
 an electronic device;
 an inset layer with a window within which the electronic device extends, at least in part; and
 an adhesive layer in contact with the inset layer, e.g. enabling the device to be assembled with an adjacent layer of the structure or of a security document or a document of value;
 at least one of the inset layer and the adhesive layer including at least one security element arranged so that a signal that is visible under predetermined illumination or that is detectable by a suitable detector system, whether optical or otherwise, is modified when the inset layer or the adhesive layer is spoilt, in particular by being torn, delaminated, or subjected to chemical or thermal attack.

Independently or in combination with the above, the invention also provides a structure, in particular for fabricating a security document or a document of value or for making an article secure, the structure comprising:
 an electronic device;
 an electronic device support, the support being of an inorganic or fiber nature; and
 a layer, in particular a fiber layer, having a window within which the electronic device extends, at least in part.

In particular, the support may include a thermochromic security element capable of changing color in irreversible manner in the event of a thermal attack.

Independently or in combination with the above, the invention also provides a structure, in particular for a security document or a document of value, the structure comprising:
 an electronic device;
 an inset layer with a window within which the electronic device extends, at least in part; and
 an adhesive layer in contact with the inset layer, e.g. enabling the device to be assembled with an adjacent layer of the structure or of a document; the structure including at least one security element arranged to be detectable, in particular visually, on the edge of the structure.

Independently or in combination with the above, the invention also provides a structure for use in fabricating a security document or a document of value or in making an article secure, the structure comprising:
 an electronic device;
 a first inset layer including a window within which the electronic device extends, at least in part;
 a layer based on an adhesive; and
 a second inset layer including a window within which the electronic device extends, at least in part; the adhesive layer serving to hold together the two inset layers together with an antenna of the electronic device.

Independently or in combination with the above, the invention also provides a structure comprising:
 an electronic device, e.g. including an electronic chip encapsulated in a resin;
 an inset layer of polymer, in particular an adhesive polymer, e.g. formed by a sheet of adhesive material such as a sheet of polyurethane, for example, said layer presenting a window within which the electronic device extends, at least in part; and
 a fiber layer.

Where appropriate, such a structure may include a layer of plastics material in contact with the polymer inset layer.

If so desired, the structure need not include a fiber layer.

In a variant, the structure includes a second fiber layer on which the inset layer and the RFID are assembled. Where appropriate, the structure may include an adhesive layer on one of the outer fiber layers, the adhesive layer optionally being covered in a removable anti-adhesive film.

Where appropriate, once activated, e.g. by supplying heat, the inset layer may present adhesive properties.

Independently or in combination with the above, the invention also provides a structure for fabricating a security document or a document of value or for making an article secure, the structure comprising:

an electronic device;

an inset layer including a window within which the electronic device extends, at least in part;

a layer based on an adhesive; and a masking layer preventing the electronic device from being seen therethrough.

The structure may include a rectilinear groove formed in one of the inset or masking layers and corresponding to a folding zone for the structure when the structure is to be incorporated in a booklet cover.

The inset layer, in particular when based on a hot-activatable adhesive, may be sandwiched between an outer cover layer and a layer of paper.

Independently or in combination with the above, the invention also provides a structure comprising:

an electronic device comprising a substrate, e.g. of epoxy glass, carrying an electronic chip encapsulated in a resin, the electronic chip being connected to an antenna via two connection tabs, the antenna possibly being carried by the substrate; and an inset layer, preferably a fiber layer, including a window within which the encapsulated chip of the electronic device extends, at least in part, the substrate of the electronic device being pressed against a face of the inset layer, outside the window.

Where appropriate, the structure may include a fiber layer assembled with the inset layer in such a manner as to cover the window on the side of the encapsulated chip.

If so desired, the fiber layer may receive printing.

Beside the substrate of the electronic device, the structure may include a fiber layer assembled with the inset layer by means of an adhesive layer, said fiber layer possibly receiving printing, where appropriate.

In a variant, the structure includes an anti-adhesive film, e.g. a silicone film, assembled with the inset layer in removable manner via an adhesive layer.

At least one of the adhesive layers of the structure may comprise an adhesive that is pressure-sensitive.

Independently or in combination with the above, the invention also provides a structure comprising:

a masking layer, e.g. made of fiber, in particular a paper layer, or made of polymer;

an adhesive layer;

an insert, e.g. substantially in the form of a disk, and incorporating an electronic device, the device comprising an electronic chip encapsulated in a resin and including an antenna;

an inset layer, in particular made of fiber, e.g. of paper, or of polymer, with a window within which the insert extends, at least in part, e.g. in full;

an adhesive layer; and optionally a masking layer or a layer of an anti-adhesive film.

The insert may include an antenna connected to the electronic chip, the antenna and the chip being encapsulated in one or more resins.

By way of example, the insert may include two stuck-on outer layers of resin and a central portion of resin, the resin of the central portion being cast and then hardened.

In an embodiment of the invention, the chip and the antenna are integrated in a film of plastics material of the insert.

The resin outer layers and/or the plastics film may be made based on polyimide, for example.

Independently or in combination with the above, the invention also provides a structure comprising:

an electronic device;

a first inset layer with a window within which the electronic device extends, at least in part;

a second inset layer having adhesive properties on being thermally activated, with a window within which the electronic device extends, at least in part; and a third inset layer with a window within which the electronic device extends, at least in part;

the electronic device being housed in the cavity formed by the three windows assembled together in register, the antenna resting between the second and third inset layers.

Where appropriate, the structure may include an additional adhesive layer on the outer face of the third inset layer to enable it to be applied of a substrate, and an adhesive layer and a masking layer on the outer face of the first inset layer to hide the portion of the electronic device visible in the window.

The invention also provides a security document or a document of value including a structure as defined above or constituted by such a structure, as can be the case in particular when the document is a visa.

The security document may preferably constitute an identity document, a visa label, or a passport booklet, for example, this list not being limiting. The document of value may constitute payment means.

The document may include a receiver layer for being assembled with the structure and the internal cohesion of said layer is preferably stronger than that of the inset layer of the structure that is to be assembled with the receiver layer of the document, and stronger than that of the masking layer, if any, of the structure.

Advantageously, the adhesion between the receiver layer of the document and the inset layer or the masking layer if any, is stronger than the internal cohesion of the inset layer or of the masking layer, if any.

A structure of the invention may be designed to be sandwiched between two fiber layers, in particular two plies of paper.

In another of its aspects, independently or in combination with the above, the invention also provides a security document or a document of value comprising:

a structure comprising:

an electronic device; and an inset layer with a window within which the electronic device extends, at least in part;

at least one first security element visible in daylight, in transmission or in reflection, said first security element being defined, for example, by the shape of the window in the inset layer of the structure;

at least one second security element visible under illumination other than daylight, the second security element being visible under UV or IR illumination, for example; and at least one third security element detectable by a non-optical device, e.g. an electromagnetic device, e.g. a detector device using magnetic resonance or X-ray fluorescence.

In another of its aspects, independently or in combination with the above, the invention also provides a security document or a document of value comprising:

a structure comprising:

an electronic device; and an inset layer with a window within which the electronic device extends, at least in part;

at least two fiber layers with the above structure being interposed and assembled therebetween.

The above structure may include a security element that remains visible in an edge of the document after the various layers thereof have been assembled together.

In another of its aspects, independently or in combination with the above, the invention also provides a security document or a document of value comprising:
- a structure comprising:
- an electronic device; and
- an inset layer with a window within which the electronic device extends, at least in part;
- a layer with which the above structure is assembled, the structure extending over a major portion of said layer, in particular over its entire area.

Independently or in combination with the above, the invention also provides a document, in particular a booklet, comprising a cover and a set of bound sheets, the cover comprising:
- a structure comprising an electronic device with or without an antenna and a fiber inset layer with a window within which the electronic device extends, at least in part; and
- an outer layer stuck onto a first face of the structure; the set of sheets including at least one endpaper stuck onto a second face of the structure, opposite from its first face.

The outer layer of the cover may be of the textile or paper type, optionally impregnated in its face that comes into contact with the structure by a keying primer.

In an embodiment of the invention, the structure includes an additional fiber inset layer with a window for receiving the electronic device in part, the two inset layers being assembled together by adhesive, the antenna of the electronic device possibly being sandwiched between these two layers.

In a variant, the structure comprises a single inset layer made of polymer adhesive together with the electronic device.

Where appropriate, the electronic device may comprise a module with an electronic chip encapsulated in a resin.

In an embodiment of the invention, the set of sheets is secured to the structure by stitching in the fold of the booklet. The stitching thread(s) may be impregnated with an adhesive on the face of the structure that is to receive the outer layer of the cover.

In a variant, the document does not include stitching securing the set of sheets to the structure.

Independently or in combination with the above, the invention also provides a passport comprising:
- a structure comprising:
- an electronic device;
- an inset layer including a window within which the electronic device extends, at least in part; and
- an adhesive layer covering the inset layer;
- a stitching thread passing through the structure and at least one sheet of the passport, in particular a sheet that is stuck to the cover of the passport.

The invention also provides a method of fabricating a structure for use in making a security document or a document of value, or for being applied to a security document, the method comprising the following steps:
- supplying an electronic device;
- supplying an inset layer with a window, preferably a through window;
- placing on the inset layer an adhesive layer enabling the inset layer to be assembled with an adjacent layer of the structure, the adhesive layer having adhesive power and cohesion that are high enough to ensure that an attempt at separating the inset layer from the adjacent layer spoils the inset layer; and
- placing the electronic device, at least in part, in the window of the inset layer.

The method may include the following steps:
- placing the adhesive layer on the inset layer; and
- making a window in the assembly constituted by the inset layer and the adhesive layer, the window being preferably a through window, and being made in particular with the help of a die or a laser.

The method may also include the fowling steps:
- supplying an adhesive layer in the form of a transfer film, e.g. one that is sensitive to pressure and/or activatable by heat, the adhesive layer being initially optionally covered by at least one anti-adhesive film;
- withdrawing the anti-adhesive film from the adhesive layer, where appropriate; and
- assembling the adhesive layer with the inset layer.

In a variant, the method includes the following steps:
- depositing an adhesive in liquid form on the inset layer or on a masking layer, if any, so as to form an adhesive layer; and
- optionally covering the resulting adhesive layer in an anti-adhesive film.

When the structure includes two inset layers, the method may include the following step:
- making at least one, preferably through, window in each of the inset layers.

When the structure includes an inset layer made of adhesive polymer and two fiber inset layers, the method may include the following steps:
- assembling the adhesive with the inset layer;
- making a through window in the assembly;
- making a through window in another inset layer; and
- assembling the two inset layers in register with the electronic device housed in the windows.

The method may include the following steps:
- depositing an adhesive layer on each of the inset layers; and
- hot- or cold-laminating the various layers of the structure with or without pressure.

The invention also provides a method of making a security document or a document of value, characterized by the fact that it comprises the following steps:
- providing a structure as defined above, the structure being preassembled; and
- assembling said structure with the security document or document of value.

This method may include the following steps:
- hot- or cold-laminating the structure with a layer of the security document or document of value.

The method may include the following steps:
- depositing an adhesive layer on the structure and/or a layer of the security document or document of value; and
- assembling the structure with the security document or document of value using the adhesive layer.

In a variant, the method may include the following steps:
- treating an outside surface of the structure so as to make it adhesive and optionally covering it temporarily in an anti-adhesive film; and
- assembling the structure with the security document or document of value by putting the treated face of the structure into contact with the document.

The method may include the following step:
- sewing the structure to at least one sheet or one layer of the security document or document of value.

Advantageously, the sewing is performed on a support of the electronic device of the structure away from an antenna and an electronic chip.

The method may include the following steps:

printing or depositing a security element on a layer of the document prior to assembly with the structure; and assembling the structure with said layer of the document.

The structure is thus incorporated in the document only when the layer(s) of the document are properly printed or the security element has been properly applied.

In a variant, the method may include the following steps:

assembling the structure with a layer of the document; and then printing or depositing a security element on the layer of the document.

BRIEF DESCRIPTION OF THE DRAWINGS

The invention can be better understood on reading the following detailed description of non-limiting embodiments of the invention and on examining the accompanying drawings, in which:

FIG. 11 is a diagrammatic and fragmentary cross-section view of a structure constituting another embodiment of the invention;

FIG. 12 is a diagrammatic and fragmentary cross-section view of a security document or document of value with the structure of FIG. 11;

FIG. 13 is a diagrammatic and fragmentary view of a window in an inset layer in accordance with the invention;

FIG. 16 is a diagrammatic and fragmentary cross-section view of a structure constituting another embodiment of the invention;

DETAILED DESCRIPTION OF EMBODIMENTS

Figure 1:
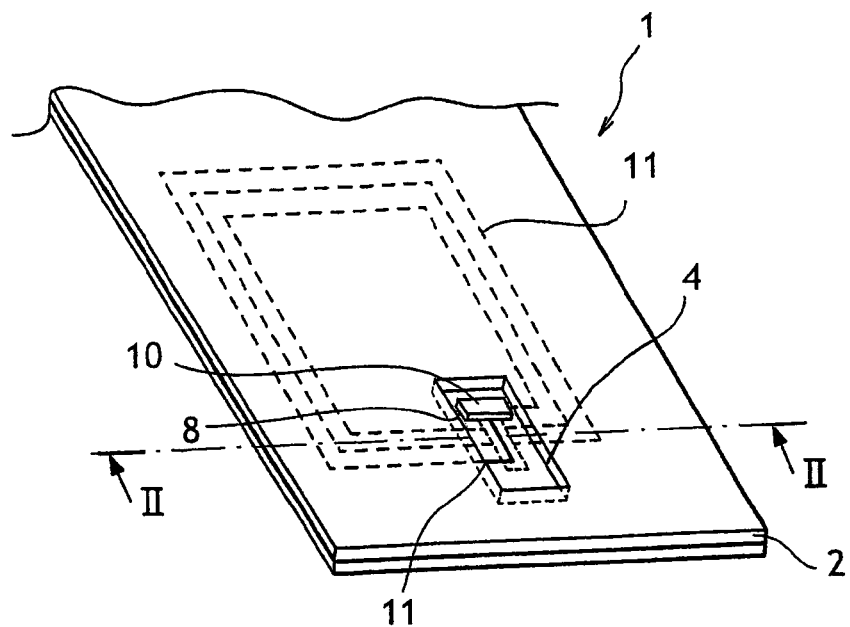
FIG. 1 is a diagrammatic and fragmentary view of a structure constituting an embodiment of the invention.

In the drawings, the relative proportions of the various elements shown are not always complied with, for reasons of clarity.

FIG. 1 shows a structure 1 in accordance with the invention for use in making a security document or a document of value.

The structure 1 includes an inset layer 2 having a through orifice defining a window 4.

In the example described, the window 4 is rectangular in shape, but it would not go beyond the ambit of the present invention for the window 4 to present some other shape, for example to be star-shaped, as shown in FIG. 13. In general, the window 4 may be of a shape that is neither circular nor rectangular, but that imitates an image, a logo, or an inscription.

In the example described, the inset layer 2 is a fiber layer, in particular a layer of paper, e.g. presenting density of about 215 g/m$^2$ and thickness of 280 μm.

The inset layer 2 may incorporate a dye, e.g. of the sulfur black type giving it a black color, the dye presenting satisfactory fixing in the inset layer 2 so as to avoid any migration of the dye into other layers when the inset layer 2 is in contact with an adhesive and/or is subjected to high temperature and/or to a humid atmosphere.

In the example described, the inset layer 2 is opaque to transmitted light and may include a security element that is visually detectable, e.g. under predetermined lighting, e.g. UV or IR lighting, or in a variant using a predetermined detector device, e.g. for detecting magnetism.

In the example described, the inset layer 2 has tracers that are detectable with a suitable detector device, e.g. tracers sold by the supplier Microtag, that are detectable by magnetic resonance.

The inset layer 2 may present cohesion with a value of about 150 Scott units, as measured using the Scott Bond apparatus.

The inset layer 2 may include any other security element such as, for example: an element presenting a variable and/or diffractive optical effect, such as, for example: a holographic, iridescent, or liquid crystal element; a magnetic or crystal coating; magnetic fibers; tracers that are detectable by magnetic resonance; tracers that are detectable by X-ray fluorescence; printing using a varnish or an ink; tracers that are luminescent or fluorescent; and compounds that are photochromic, thermochromic, electroluminescent, and/or piezochromic, and/or that change color on coming into contact with one or more predetermined substances.

Figure 2:
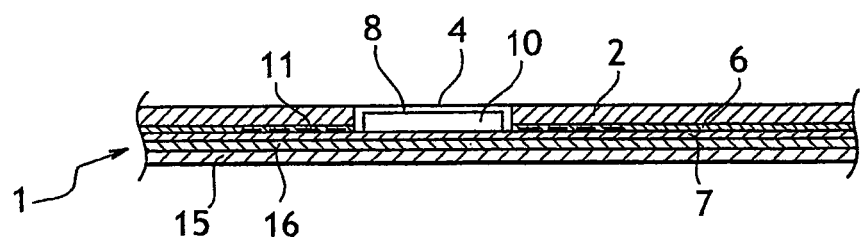
FIG. 2 is a diagrammatic and fragmentary cross-section view on II-II of the FIG. 1 structure.

As shown in FIG. 2, an adhesive layer 6 is deposited on the bottom face of the inset layer 2 in order to enable it to be assembled with a support 7 of an electronic device 8 of the contactless type.

In general, the thickness of the inset layer is greater than or equal to that of the encapsulated bare chip or a portion of a module including the chip, as appropriate. The dimension of the window is greater that or equal to that of the encapsulated bare chip or of a portion of the module including the chip, as appropriate.

In the example described, the adhesive 6 is an adhesive that is sensitive to pressure. In a variant, the adhesive 6 could be of any other type, for example it could be an adhesive that is sensitive to heat.

In the example described, the adhesive layer 6 contains a permanent adhesive including a solvent, for example of the acrylic type, and it presents a thickness of about 25 µm.

The adhesive layer 6 is initially in the form of a transfer film and it is cold-laminated on the inset layer 2.

The adhesive power and the cohesion of the adhesive layer 6 are greater than the internal cohesion of the inset layer 2.

In addition to the support 7, the electronic device 8 includes an electronic chip 10.

In the example described, the chip 10 is a chip sold under the name Picotag 16 KS by the supplier Inside and presents a shape that is square with a section of about 4 square millimeters (mm$^2$) and a thickness of about 200 µm.

The chip 10 is connected to an antenna 11 which is made of aluminum and etched on the support 7. The support comprises a film made of transparent polyethylene terephthalate (PET) having a thickness of about 40 µm.

The chip 10 may be made on a silicon substrate, or in a variant on a polymer substrate.

On one of its faces, the support 7 has a keying primer or a coating containing an irreversible thermochromic compound that changes color when its temperature exceeds 65° C., e.g. going from colorless to reddy-pink.

The structure 1 includes an anti-adhesive film 15 secured to the support 7 via an adhesive layer 16. This layer is identical to the adhesive layer 6. The anti-adhesive film 15 is for removal prior to assembly of the structure on a document or an article.

There follows a more detailed description of the steps involved in fabricating the structure 1.

Initially, the adhesive layer 6 secured on an anti-adhesive film (not shown) is cold-laminated on the bottom face of the inset layer 2.

An opening is made through the assembly constituted by the inset layer 2, the adhesive layer 6, and the anti-adhesive film, using a cutter machine provided with a die, this opening serving to form the window 4 in the structure 1.

Thereafter the anti-adhesive film is removed.

The inset layer 2 with the adheive layer 6 thereon, the support 7 with the antenna 11 thereon, the adhesive layer 16, and the anti-adhesive film 15 are assembled together by cold-lamination in a specific machine, the chip 8 being received in the window 4 without projecting therebeyond, as can be seen in FIGS. 1 and 2.

The structure 1 as obtained in this way can be used for fabricating a security document.

Figure 3:
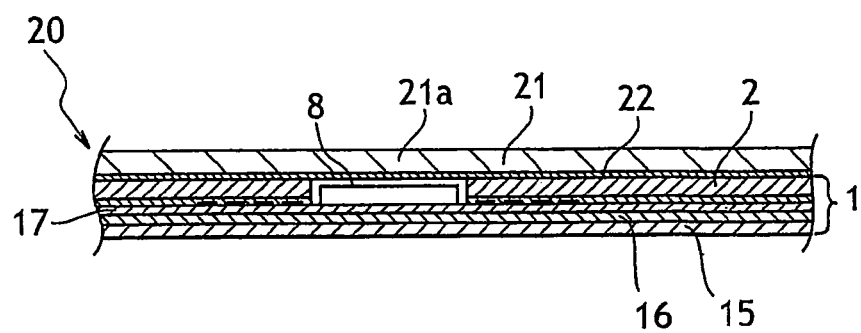
FIG. 3 is a diagrammatic and fragmentary cross-section view of a security document or a document of value assembled with the structure of FIG. 2.

FIG. 3 shows a document 20 such as a visa label that comprises a fiber layer 21 of paper, said layer 21 being cold-laminated on the top face of the structure 1 via an adhesive layer 22 that is sensitive to pressure.

The document 20 may also receive a security element, e.g. a holographic patch, an ink that reacts to non-polar solvents, or an irreversible thermochromic ink that changes color when its temperature reaches 65° C., these security elements being preferably implemented outside the portion 21a of the layer 21 situated facing the window 4 in the structure 1.

The fiber layer 21 may include other security elements such as visible fluorescent colored security fibers, invisible fluorescent flakes for authentication purposes, and chemical reagents such as agents that react with acids, bases, oxidizers, and polar solvents, in order to prevent any attempt at falsification using chemicals.

The document 20 can thus present the following advantages:

security in terms of authentication:
first level security: visible fibers, e.g. a star-shaped window that is visible in transmitted light;
second level security: fluorescent fibers and flakes detectable under UV illumination having a wavelength of 365 nanometers (nm); and
third level security: Microtag security detectable with a detector device;

security in terms of protection against falsification:
protection against chemical attack: reagents in the paper producing a colored spot that is visible on the surface of the label in the event of a chemical attack. Such chemical attacks can occur during attempts at erasing inscriptions present on the printed surface of the visa or during attempts at removing the visa applied on a passport, or indeed during an attempt at opening the visa in order to recover the electronic device;
against thermal attacks: attempts at removing the visa with the electronic device after it has been applied to passport paper (peeling started between the passport and the inset layer) leading to a change in the color of the thermochromic compound at the electronic device support, this change in color being visible in reflected light and above all in light transmitted through the window 4 in the inset layer 2, attempts at recovering the printed security paper (peeling between the security paper and the inset layer) leading to the appearance of a colored pattern in the printing performed using a thermochromic ink at the surface of the security paper that makes any fraudulent use awkward; and
against mechanical attacks, but without the use of temperature: attempts at removing the visa with the electronic device after it has been applied to passport paper (peeling started between the passport and the inset layer) leading to the inset layer becoming delaminated with a portion remaining on the passport paper and another portion remaining on the label, thus making it difficult to reuse the visa in full. If the label is nevertheless stuck onto another passport, during an inspection there will in any event be a loss of Microtag tracer detection signal level since part of the inset layer is missing from the label. Attempts at recovering the printed security paper on its own (peeling between the security paper and the inset layer) lead to delamination of the inset layer or of the visa. If the inset layer is delaminated, the pattern that is visible in transmitted light through the window will very likely be spoilt, thereby revealing falsification.

Furthermore, the electronic device 8 is not visible in transmitted light outside the window 4, thereby improving the appearance of the document 20 and of patterns printed thereon.

The structure may be of a different shape.

FIG. 16 shows a structure 1' that differs from the above-described structure 1 in that it includes on each face of the inset layer 2 a respective adhesive layer 16. Each adhesive layer 16 is covered in an anti-adhesive film 15 that can be removed while the structure 1' is being assembled with a document or an article.

Figure 4:
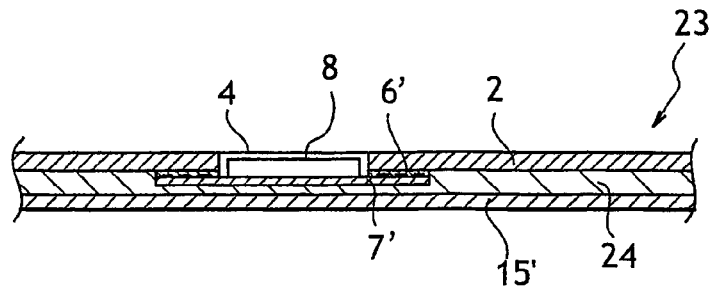
FIG. 4 is a diagrammatic and fragmentary cross-section view of a structure constituting another embodiment of the invention.

FIG. 4 shows a structure 23 for use in making a security document constituting another embodiment of the invention.

The structure 23 comprises:
an inset layer 2 as described above;
an adhesive layer 6' extending only around the window 4 of the inset layer 2, and not over the entire face of the inset layer 2;
a support 7' for the electronic device 8, the support 7' extending only over a portion of the inset layer 2, over the adhesive layer 6'
an adhesive layer 24 extending over the entire bottom face of the inset layer 2; and
a masking layer 15'.

Figure 5:
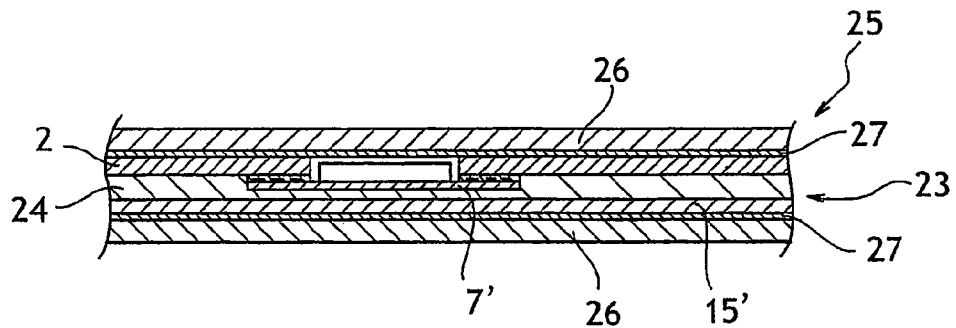
FIGS. 5 and 6 are diagrammatic and fragmentary cross-section views of two security documents or documents of value assembled with the structure of FIG. 4.

The structure 23 can be incorporated in a security document 25 as shown in FIG. 5, by being laminated between two layers of paper 26 via two adhesive layers 27. These layers may comprise an adhesive that is sensitive to heat.

In the example described, the inset layer 2 presents internal cohesion that is less than or equal to that of the paper layer 26 on which the layer 2 is assembled. Thus any attempt at separating the paper layer runs the risk of delaminating the inset layer 2.

Still in the present example, the masking layer 15' presents internal cohesion that is less than or equal to that of the adjacent paper layer 26. The adhesion between the inset layer 2 and the masking layer 15', between the inset layer 2 and the adjacent layer 26, and between the masking layer 15' and the adjacent paper layer 26 is stronger than the cohesion of the inset layer 2 and than the cohesion of the masking layer 15'. The inset layer 2 and the masking layer 15' present similar degrees of cohesion. The adhesive layer 24 presents adhesive power and cohesion that are greater than the cohesion of the inset layer 2 and than the cohesion of the masking layer 15'.

This prevents any attempt at falsifying the document 25 by tearing away or delaminating the inset layer 2 or the masking layer 15' in order to remove the electronic device 8.

Security against falsification is reinforced when the inset layer 2 or the masking layer 15' include security elements, since any spoiling of the inset layer 2 and/of of the masking layer 15' can lead to damage to the security elements or to a change in the optical, electrical, or magnetic signal of a kind that can be detected easily.

Figure 6:
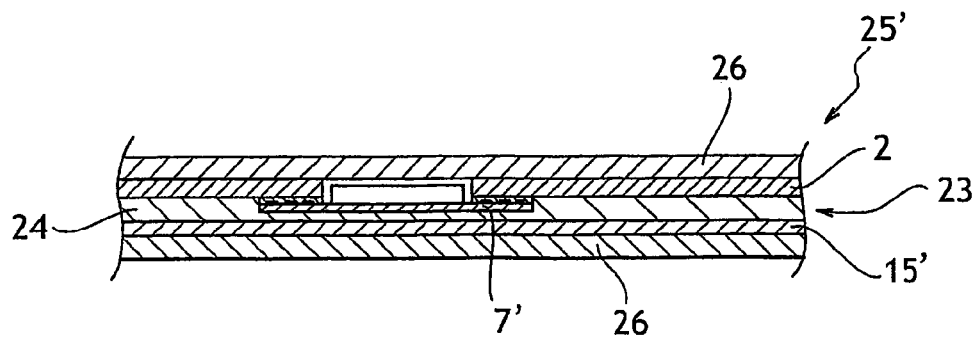

The structure 23 can also be incorporated in a document 25' as shown in FIG. 6, by previously treating the outside faces of the inset layer 2 and of the masking layer 15' so as to give them adhesive properties that can be reactivated when hot.

The paper layers 26 are then hot-laminated to the structure 23.

Figure 7:
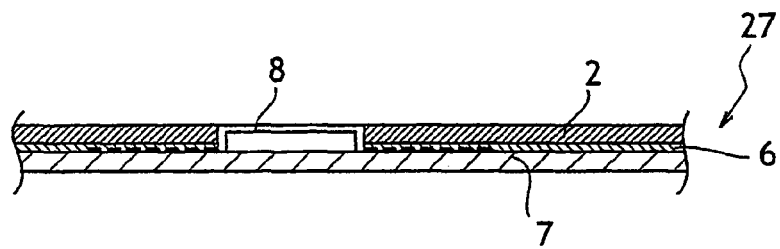
FIG. 7 is a diagrammatic and fragmentary view in cross-section of a structure constituting another embodiment of the invention.

FIG. 7 shows a structure 27 comprising in succession:
an inset layer 2;
an adhesive layer 6; and
a support 7 for the electronic device 8, the support 7 extending over the entire bottom face of the inset layer 2. The antenna is silkscreen printed on the support 7 and the chip is housed in the window 4.

Figure 8:
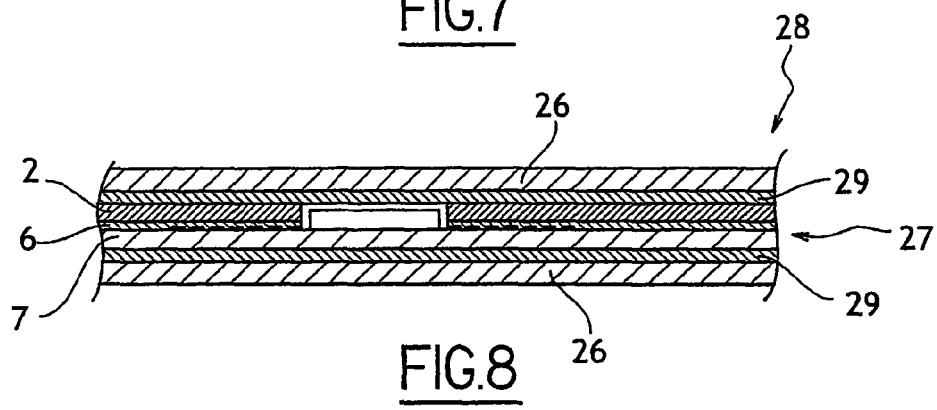
FIG. 8 is a diagrammatic and fragmentary cross-section view of a security document or document of value with the structure of FIG. 7.

Such a structure 27 can be used, for example, in making a security document or document of value 28 as shown in FIG. 8.

The structure 27 can be laminated to be associated with two paper layers 26 via two adhesive layers 29.

Each adhesive layer 29 is, for example, initially in the form of a film to be transferred sandwiched between two anti-adhesive films, e.g. of the type comprising a layer of paper with a silicone coating.

It would not go beyond the ambit of the present invention for the electronic device to be of a type different from that described above.

Figure 9:
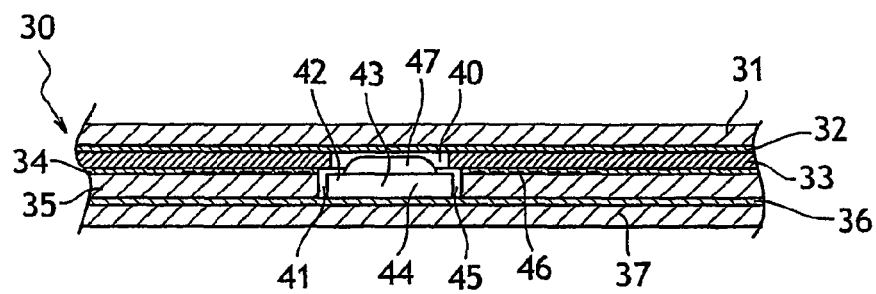
FIGS. 9A and 9 are diagrammatic and fragmentary cross-section views of structures constituting other embodiments of the invention.

FIG. 9 shows a structure 30 comprising in succession:
a first masking layer 31;
a first adhesive layer 32;
a first inset layer 33 having a first window 40;
a second adhesive layer 34;
a second inset layer 35 with a second window 41 that is larger than the window 40;
a third adhesive layer 36; and
a second masking layer 37.

An electronic device 42 is housed in the windows 40 and 41.

Figure 9A:
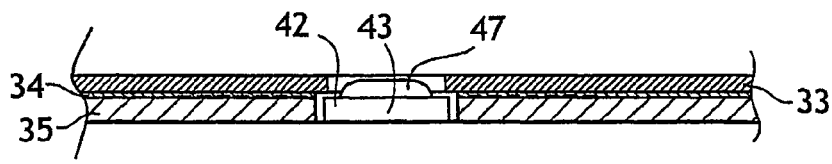

FIG. 9A shows the structure 30 without the masking layers 31 and 37.

Each of the masking layers 31 and 37 comprises, for example, a black core covered on its outer face by a white coating suitable for receiving printing.

The white coating may, for example, include fluorescent particles known as Hilites that are detectable under UV illumination having a wavelength of about 365 nm.

The white coating may also include security fibers, e.g. double-fluorescent security layers excitable under UV radiation respectively at 254 nm and at 365 nm.

The masking layers 31 and 37 may also include, incorporated in the black core, tracers, e.g. of the Microtag type, detectable with a portable detector device.

Advantageously, the masking layers 31 and 37 are specifically opaque to make the electronic device 42 undetectable in transmitted light.

By way of example, the adhesive layers 32, 34, and 36 contain an adhesive of the type that is sensitive to pressure.

The adhesive layers 32 and 36 may initially be deposited in liquid form on the masking layers 31 and 37 on their inside faces, i.e. on their respective black cores.

The adhesive layer 34 may initially be in the form of a transfer film, for example.

In the example described the adhesive layers 32 and 36 present a thickness of about 25 μm. The layer 34 may be thicker, so as to compensate the thickness of the antenna, e.g. a thickness slightly greater than 100 μm.

By way of example, the electronic device 42 can comprise a module 43 sold under the name MOA4 by the supplier Philips.

This module 43 occupies an area of about 42 mm$^2$ and presents a total thickness of 410 μm.

In its bottom portion, the module 43 has an integrated circuit, or in a variant a plurality of integrated circuits, and a connection circuit 44 with connection tabs 45 connected to a wire-type copper antenna 46 deposited on the inset layer 35, and in its top portion it comprises an encapsulating resin 47.

In the example described, the inset layer 33 is a fiber layer based on cellulose fibers presenting density of about 320 g/m$^2$ and thickness of about 400 μm.

The window 40 in the inset layer 33 receives the encapsulating resin 47 of the module 43, this encapsulating resin 47 presenting a thickness of about 330 μm and occupying an area of about 25 mm$^2$ in the example shown.

In the example described, the inset layer 33 is white in color and can contain security elements, e.g. invisible luminescent tracers that fluoresce yellow light, being detectable with a UV lamp having a wavelength of about 365 nm.

The inset layer 33 may further include, for example, tracers that are detectable with a portable X-ray fluorescent device, where such tracers could be those sold by the supplier Key-Masters Technologies.

In the example. described, the inset layer 35 is a fiber layer, e.g. based on cellulose fibers, e.g. fibers that are white in color, e.g. presenting a density of about 90 g/m² for a thickness of 125 µm.

The window 41 of the inset layer 35 receives the connection circuit 44 of the module, this connection circuit 44 presenting a thickness of about 120 µm, for example.

The inset layer 35 may include security elements such as, for example: invisible luminescent tracers that fluoresce red light, detectable using a UV lamp having a wavelength of 365 nm.

In the example described, the cohesion of the inset layer 35, as measured using a Scott Bond device, is less than or equal to the cohesion of the inset layer 33 and that of the masking layers 31 and 37.

The adhesive layer 34 presents adhesive power and cohesion greater than the internal cohesion of the inset layers 33 and 35.

There follows a description in greater detail of the steps involved in fabricating the structure 30.

The adhesive layer 34 is initially sandwiched between two removable anti-adhesive films (not shown).

After one of the two anti-adhesive films has been separated, the adhesive layer 34 is cold-laminated on one face of the inset layer 33.

Thereafter, a window is made in the assembly constituted by the inset layer 33, the adhesive layer 34, and the anti-adhesive film on said adhesive layer 34.

This window can be made using a cutter machine provided with a die.

A window is also made in the inset layer 35.

The wire antenna 46 of the electronic device 42 is deposited on one of the faces of the inset layer 35.

The module 43 is inserted into the window 41 in the inset layer 35 so that the connection circuit 44 is fully received therein, being connected via its connection tabs 45 to the antenna 46. This connection can be made, for example, by soldering.

The anti-adhesive film that is still present on the adhesive layer 34 is withdrawn.

The assembly constituted by the inset layer 33 and the adhesive layer 34 is assembled with the inset layer 35 in such a manner that the encapsulating resin 47 of the module 43 is received in the window 40 in the inset layer 33 and the antenna is sandwiched between the inset layers 33 and 35. The adhesive layer 34 can contribute to holding the antenna when it is not printed, but made of wire.

Finally, the masking layers 31 and 37 that have previously received the pressure-sensitive adhesive layers 32 and 36 are laminated to the assembly including the inset layers 33 and 35.

The resulting structure 30 can then, for example, receive printing using one or more inks, in particular one or more inks that react with chemicals, one or more optically variable inks, and it may possibly also receive a holographic patch.

The structure may also be personalized using the white layers of the masking layers 31 and 37.

Figure 10:
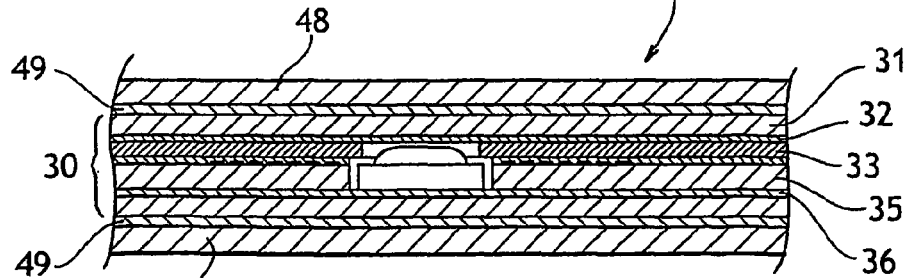
FIG. 10 is a diagrammatic and fragmentary cross-section view of a security document or document of value with the structure of FIG. 9.

The resulting structure 30 can be inserted between two transparent plastics layers 48 and can be hot-laminated with these layers 48 via the adhesive layer 49, as shown in FIG. 10.

This produces an identity document 39 in the form of a card including the electronic device and ready for use.

The structure 30 assembled in the document extends to the edge of the document so that the security elements present, in particular in the inset layers 33 and 35 are visible at the edge and can be detected thereon using appropriate means or visually.

Such an identity document can present the following advantages:

authentication security:

first level: optically variable ink(s), holographic path, . . . ;

second level: double-fluorescent fibers and fluorescent particles on both printed faces of the document, yellow and red fluorescent effect on the edge of the document, . . . ; and third level: Microtag and KeyMaster securities respectively detectable using specific equipment; . . .

security against falsification:

against chemical attacks: reagents in the security inks on each of the paper surfaces of the document, giving rise to a colored spot that is visible on the surface of the card in the event of a chemical attack. Such chemical attacks can arise during attempts at opening the plastics layers or during attempts at erasing inscriptions present on the printed surface of the document, or indeed during attempts at recovering the electronic device;

against mechanical attacks: attempts at removing the electronic device lead to the inset layer 33 and/or the inset layer 35 tearing or being delaminated. These attempts also lead to a loss of yellow and red fluorescence in the edge and to a change in the signal delivered either by the KeyMaster tracers present in the inset layers or by the Microtag tracers present in the masking layers, with attempts at opening the document leading to delamination of the white layers in the masking layers and thus to damage to the inscriptions present thereon.

Furthermore, the electronic device cannot be seen at all in the final document, neither by transmission nor by reflection, thereby improving the appearance of the card and of the printing thereon.

FIG. 11 shows a structure 50 constituting another embodiment of the invention for making a security document or a document of value, in the manner described below.

The structure 50 comprises in succession:

a first inset layer 51 with a first window 58;

a first adhesive layer 52;

a second inset layer 53 with a second window 59 that is larger than the first window 58;

a second adhesive layer 54; and a masking layer 55.

By way of example, the first inset layer 51 is a fiber layer based on cellulose fibers, having a density of 270 g/m² and a thickness of 350 µm.

By way of example, the first inset layer 51 is white, including security elements such as, for example: invisible traces that fluoresce yellow-green and having the commercial reference SC4 as sold by the supplier Angstrom and visually detectable using a lamp emitting UV radiation at a wavelength of 365 nm, and quantitatively detectable using a scanner sold by the supplier Angstrom.

The structure 50 further includes an electronic device 60 of the contactless type, comprising a support 61 made of inorganic material with a thickness of about 130 µm.

The device 60 also comprises a chip protected by an encapsulating resin 62, e.g. having a thickness of about 330 µm.

The support 61 carries a wire antenna 63 made of copper.

The support 61 may present a section of 4.7 centimeters (cm) by 12 cm, for example.

The window 58 in the inset layer 51 receives the encapsulating resin 62.

In the example described, the second inset layer 53 is a fiber layer based on cellulose fibers having a density of 100 g/m2 and a thickness of about 130 µm, said thickness being substantially equal to that of the support 61.

By way of example, the inset layer 53 is constituted by white paper, and it may include security elements such as invisible, red fluorescing luminescent SC10 tracers that can be detected visually using a UV lamp emitting UV radiation with a wavelength of 365 nm, and also in quantitative manner with a scanner sold by the supplier Angström.

In the example described, the inset layer 51 presents internal cohesion that is less than or equal to that of the inset layer 53. This layer presents internal cohesion that is less than or equal to that of the masking layer 55. The adhesion between the inset layer 51 and the second inset layer 53 is greater than the cohesion the inset layer 51. The adhesion between the masking layer 55 and the inset layer 53 is greater than the cohesion of the inset layer 53. The adhesive layers 52 and 54 present adhesive power and cohesion that is greater than the cohesion of the inset layers 51 and 53 and of the masking layer 55.

In the example described, the masking layer 55 is black, the dye or the pigment used for coloring it preferably being resistant to migrating under predetermined conditions of temperature and humidity, e.g. 80% relative humidity and 65° C., with a contact pressure that is less than 1 kilogram per square centimeter ($kg/cm^2$), for example.

By way of example the adhesive layers 52 and 54 comprise an adhesive of the pressure-sensitive type, and they are applied in liquid form. By way of example these adhesive layers present a thickness of about 25 µm.

There follows a more detailed description of the steps involved in fabricating the structure 50.

The inset layer 51 receives an adhesive layer 52 in liquid form on its inside face.

The masking layer 55 also receives an adhesive layer 54 in liquid form on its inside face.

A window is then made, in particular by using a cutter machine provided with a laser, through the assembly constituted by the inset layer 51, the adhesive layer 52, and an anti-adhesive film fitted on the adhesive layer 52.

A window is also made in the inset layer 53.

Then, after the anti-adhesive film has been withdrawn from the adhesive layer 52, the inset layer 51 is assembled with the electronic device 60, the inset layer 53, and the masking layer 55 using a specific machine.

The support 61 of the electronic device is housed in the window 59 of the inset layer 53 and the chip with the encapsulating resin 62 is housed in the window 58 of the inset layer 51.

The resulting structure 50 can be used for fabricating a passport booklet 80, for example.

Figure 14:
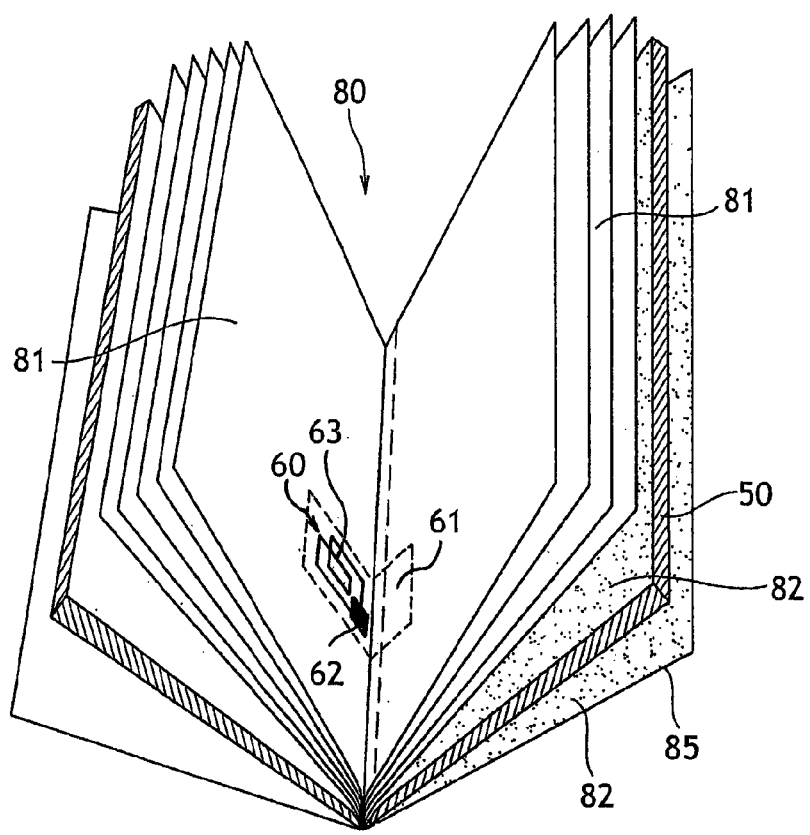
FIG. 14 is a diagrammatic and fragmentary view of a security document in accordance with the invention having a sewn-on structure.
Figure 15:
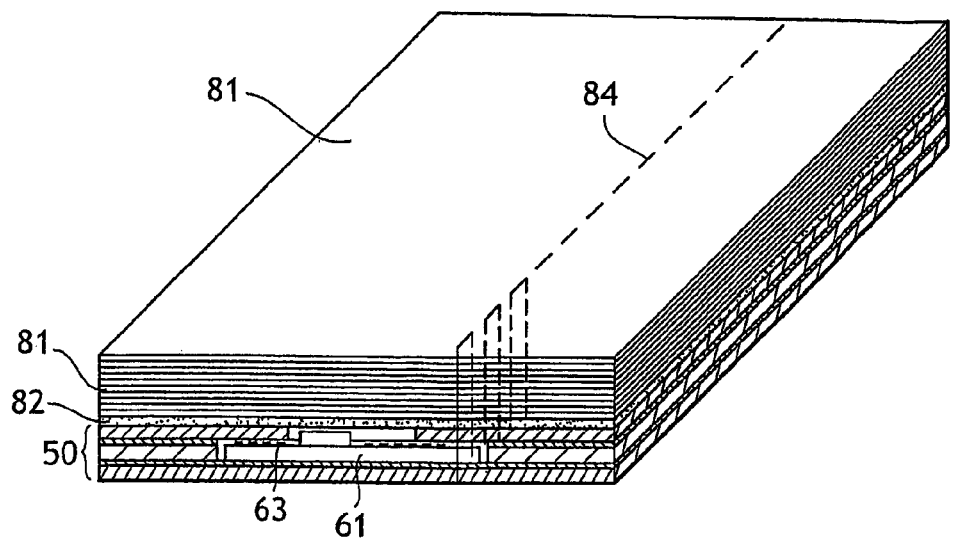
FIG. 15 is a diagrammatic and fragmentary view showing a set of sheets and a structure for being sewn together to form the document Of FIG. 14.

Fabrication of the passport booklet 80 can comprise the following steps, implemented on an assembly machine:
  assembling the structure 50 with a set of sheets 81 comprising visa pages and security films, this assembly being performed on the endpaper by means of a liquid adhesive 82, as shown in FIG. 15;
  stitching the set of sheets 81 and the structure 50 in centered manner, the stitching being performed in such a manner that the set of sheets and a portion of the support 61 of the electronic device 60 are sewn together, as shown in FIG. 15. The stitching 84 takes place away from the antenna 63 and the electronic chip of the device 60 so as to avoid interfering with the operation of the electronic device 60;
  assembling the sewn sheets 81 and the structure with a textile type sheet 85 coated in a liquid adhesive 82 so that the structure 50 is sandwiched between the paper sheets and the coated textile sheet, as shown in FIG. 14;
  decorating the final cover on its coated face by hot-transferring foil; and
  folding the booklet at the line of stitching.

The resulting security document can present the following advantages:
  falsification security against mechanical attacks:
    any attempt at removing the electronic device is made very difficult since the electronic device is sewn to the passport assembly;
    any attempt at removing the electronic device by peeling and removing the stitching thread leads to visible delamination of the inset layer 51 or 53 and interferes with recognizing yellow and red fluorescence at the edge of the cover, whether this is done visually or automatically using the Angstrom scanner;
  authentication security:
    second level: yellow and red fluorescent effect on the edge of the passport; and
    third level: measuring the spectral signature of the fluorescence at the edge by using a dedicated scanner.

Furthermore, the electronic device cannot be seen in the cover of the final passport booklet, neither in transmission nor in reflection.

In a variant, the structure 50 can be incorporated in a security document 70 by being laminated between two sheets of paper 71 by means of two adhesive layers 72, as shown in FIG. 12.

Figure 17:
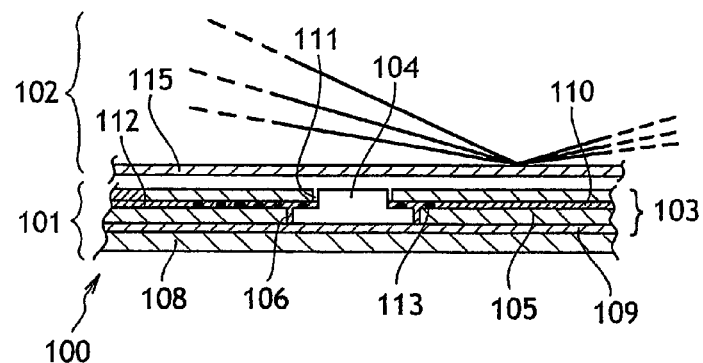
FIG. 17 is a diagrammatic and fragmentary cross-section view of a booklet constituting an embodiment of the invention.

FIG. 17 shows a booklet 100 such as a passport in accordance with the invention having a cover 101 and a set of bound sheets 102.

The cover 101 includes a structure 103 having an electronic device 104 and a fiber inset layer 105 with a window 106 within which the electronic device 104 extends in part.

By way of example, the electronic device 104 is in the form of a module comprising an electronic chip encapsulated in a resin and secured to a substrate, which substrate carries an antenna connected to two connection tabs of the electronic chip.

The structure described corresponds to that shown in FIG. 9, but the masking layer 31 is replaced by the set of bound sheets 102 and the masking layer 37 is replaced by an outer layer 108.

The cover further includes an outer layer 108 stuck to the structure 103 by means of an adhesive layer 109.

By way of example, the outer layer 108 can be made of latex-impregnated paper and can receive a plastics coating. In a variant, the outer layer 108 is made of a plastic-impregnated textile and receives a plastics coating.

In the example described, the structure 103 has an additional fiber inset layer 110 presenting a window 111 of section smaller than the window 106 and arranged to receive part of the electronic device 104.

The inset layers 105 and 110 are assembled together by an adhesive layer 112, e.g. comprising a liquid adhesive, the electronic device 104 including an antenna 113 being previously placed on the layer 105 prior to receiving the adhesive layer 112.

The set of sheets 102 includes an endpaper 115 stuck to the structure 103 beside the additional fiber layer 110.

Where so desired, this additional inset layer 110 can be made of a material other than paper, e.g. of polymer.

There follows a description of steps in a method of fabricating the structure 103.

Figure 18:
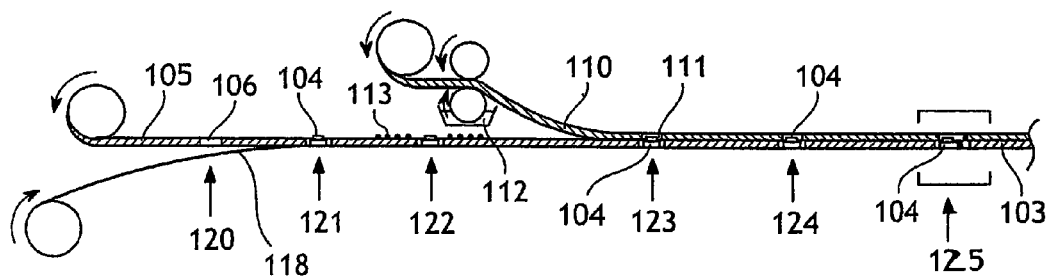
FIG. 18 is a diagrammatic and fragmentary view showing steps in the method of fabricating the structure of FIG. 17.

As shown in FIG. 18, in an initial step 120, a window 106 is made in the paper layer 105.

Then, in a step 121, the electronic device 104 is brought into the window 106 by means of a support sheet 118 carrying the electronic device 104.

In a step 122, the antenna 113 is placed on the layer 105 and is connected to the electronic device 104 by soldering.

In a step 123, the layer 105 is brought into contact with the layer 110 that has previously received an adhesive layer 112 applied by transfer rollers. The layers 105 and 110 are laminated in register so as to cause the windows to coincide.

The electronic device 104 extends in the windows 106 and 111 in the layers 105 and 110.

In a step 124, the structure 103 is cut to the desired format.

In a step 125, the structure 103 is subjected to lamination under pressure and temperature in order to harden and/or cross-link the adhesive.

In a variant of step 123, the adhesive layer 112 is applied in the form of a hot-activatable film between the layers 105 and 110, and the assembly is hot-laminated under pressure, e.g. between two rollers or in a plate press.

In the above-described method, it is possible to expose the structure 103 temporarily to ultrasound in order to maintain the prepositioning of the various components of said structure 103 prior to final hot-assembly under pressure.

The support sheet 118 is removed at the end of the method.

The structure 103 described above with reference to FIG. 17 or other structures made in accordance with the invention can be assembled with a booklet cover in various ways.

Figure 19:
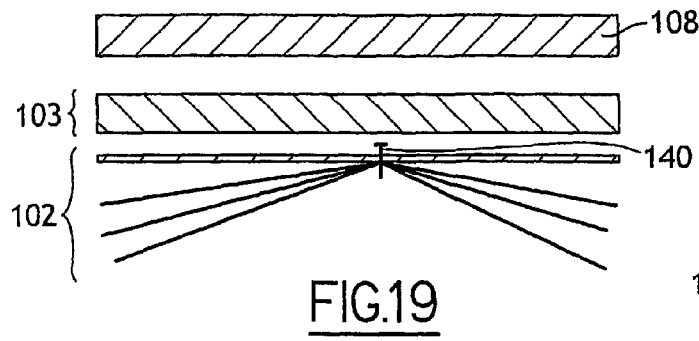
FIGS. 19 and 20 are diagrammatic and fragmentary views showing two examples of booklets in accordance with the invention.

As shown in FIG. 19, the set of sheets 102 can be assembled with the structure 103 before the structure 103 is assembled with the outer layer 108 of the cover.

In the example of this figure, the sheets 102 are connected together by stitching 140 which is not used for securing the sheets 102 to the remainder of the cover.

Figure 20:
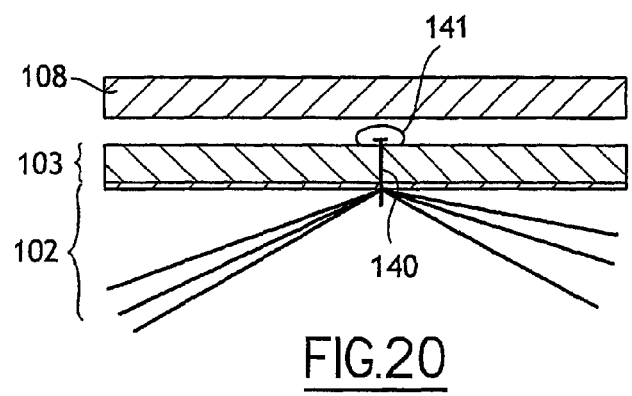

In a variant, as shown in FIG. 20, the stitching 140 also serves to secure the set of sheets 102 to the structure 103.

The thread(s) of the stitching 140 can advantageously be impregnated in an adhesive 141 serving to bond the stitching with the outer sheet layer 108.

Figure 21:
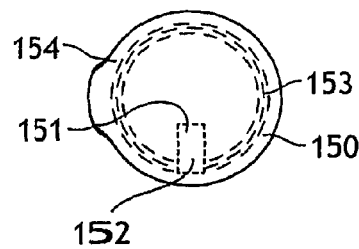
FIG. 21 is a diagrammatic and fragmentary view of an insert incorporating an electronic device.

FIG. 21 shows an insert 150 comprising an electronic device 151 provided with an electronic chip 152 connected to an antenna 153.

In the example described, the insert 150 is in the form of a disk.

The chip 152 is made on a film of plastics material.

The chip 152 includes wires for connection to the antenna 153.

The chip 152, the connection wires, and the antenna 153 can be encapsulated in one or more resins.

By way of example, the insert 150 comprises two layers of outer encapsulation resin that are stuck together and a central layer of resin, the resin of the central portion being cast and then hardened.

The film of plastics material and/or the outer layers of encapsulation resin may be based on polyimide (PI) or other materials such as epoxy glass films associated with resins. Polyimide is a material that withstands high temperatures (250° C. continuously), that presents excellent mechanical strength over the temperature range −100° C. to +200° C., that presents good resistance to impacts, good resistance to chemicals, satisfactory electrical insulation properties, and a very small coefficient of expansion. At least one of the resins may be selected from a thermosetting resin, in particular having a high destruction point, e.g. above 400° C.

In order to increase the distance over which the chip can communicate with a reader, it is possible to add an amplifying antenna (not shown) to the insert 150. This amplifying antenna extends around the antenna of the chip, outside the insert, on the inset layer.

By way of example, the insert 150 presents a thickness lying in the range 200 μm to 300 μm, e.g. being about 250 μm.

Figure 22:
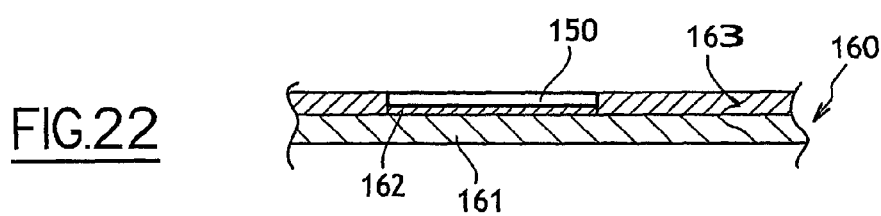
FIGS. 22 to 24 are diagrammatic and fragmentary cross-section views of structures in accordance with the invention incorporating the insert of FIG. 21.

FIG. 22 shows a structure 160 constituting an embodiment of the invention comprising a paper-masking layer 161 having an insert 150 as described above stuck thereon, e.g. using a layer 162 of adhesive based on a hot-activatable material, e.g. polyurethane, e.g. with a thickness lying in the range 20 μm to 25 μm.

The structure 160 also includes an inset layer 163 formed by another film of hot-activatable adhesive, e.g. polyurethane, and provided with a window surrounding the insert 150 and presenting thickness that is selected to compensate for the thickness of the insert 150 plus the underlying adhesive 162.

Figure 23:
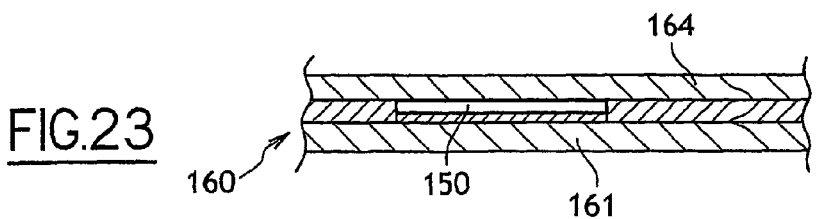

As shown in FIG. 23, if so desired, the structure 160 may include a fiber masking layer 164, said layer 164 and the masking layer 161 having the insert 150 sandwiched between them.

The structure 160 with the fiber layer 164 may present thickness lying in the range 400 μm to 450 μm, for example.

Figure 24:
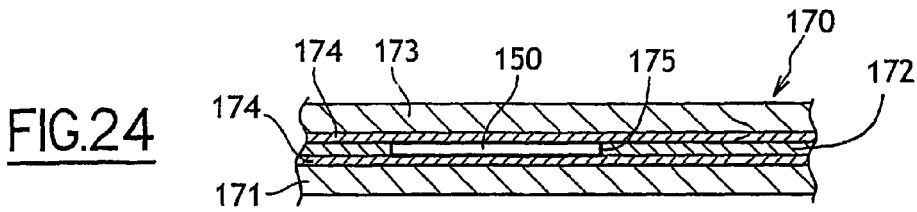

FIG. 24 shows a structure 170 constituting another embodiment of the invention, comprising two fiber masking layers 171 and 173 having an inset fiber layer 172 sandwiched between them, e.g. a layer based on natural and/or synthetic fibers, for example, e.g. cellulose obtained by a wet technique or a dry technique.

This inset layer 172 includes a window 175 arranged to receive an insert 150, e.g. of the kind defined above.

The layer 171-173 are assembled together by two adhesive layers 174, e.g. of a hot-activatable material, e.g. polyurethane.

The amplifying antenna can be deposited between the inside face of the masking layer 173 and the adhesive 174, or between the masking layer 171 and the adhesive 174, or indeed on the final document, providing the amplifying antenna surrounds the insert 150.

Figure 25:
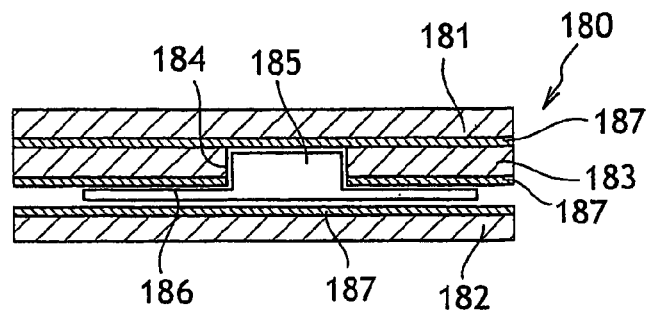
FIGS. 25 to 28 are diagrammatic and fragmentary cross-section views showing various structures constituting different embodiments of the invention.

FIG. 25 shows a structure 180 constituting another embodiment of the invention, comprising two outer masking layers 181 and 182 made of paper having an inset layer 183 of paper sandwiched between them.

This inset layer presents a window 184 suitable for receiving an electronic device 185, in part.

The electronic device includes a substrate 186 outside the window 184 that is sandwiched between the fiber layer 182 and the inset layer 183.

The various layers 181-183 are assembled together by adhesive layers 187, e.g. comprising a pressure-sensitive adhesive.

If so desired, the outer masking layers 181 and 182 can receive printing.

Figure 26:
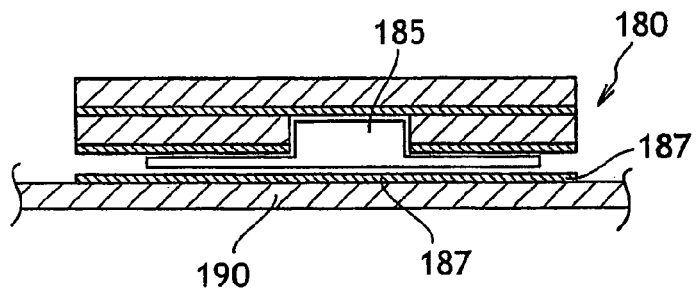

As shown in FIG. 26, the masking layer 182 can be replaced by an anti-adhesive support 190 on which the electronic device 185 rests.

Figure 27:
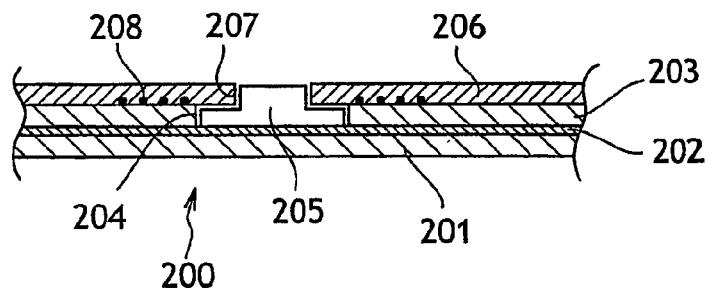

FIG. 27 shows a structure 200 that does not have a fiber layer, comprising in succession:
a masking layer 201 of plastics material;
a layer 202 of a hot-activatable adhesive;
an inset layer 203 of plastics material presenting a window 204 for receiving part of an electronic device 205; and
a layer 206 of an adhesive, e.g. a hot-activatable adhesive, that does not adhere instantly, said layer presenting a window 207 for receiving part of the electronic device 205 and having an antenna 208 of the electronic device 205 embedded therein.

Figure 28:
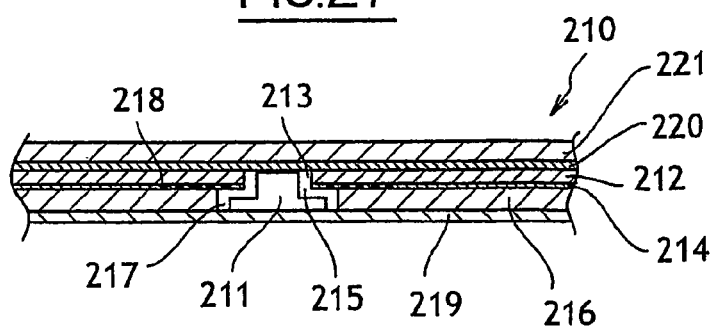

FIG. 28 shows a structure 210 comprising:
an electronic device 211;
a first inset layer 212 with a window 213 within which the electronic device extends, at least in part;

a second inset layer 214 having adhesive properties when thermally activated and including a window 215 within which the electronic device extends, at least in part; and a third inset layer 216 with a window 217 within which the electronic device extends, at least in part, the electronic device being housed in the cavity formed by the three windows 213, 215, and 217 that are assembled together in register, the antenna 218 resting between the second and third inset layers.

The structure also comprises an additional layer 219 of adhesive on the outer face of the third inset layer 216 to enable it to be applied to a substrate, and an adhesive layer 220 and a masking layer 221 on the outer face of the first inset layer 212 in order to hide the portion of the electronic device that is visible in the window.

Naturally, the invention is not limited to the embodiments described above.

In particular, it is possible to combine the characteristics of the various above-described embodiments with one another in variants that are not shown.

In the above-described structure, the electronic devices, e.g. the modules, may be either way up, i.e. head-up or head-down.

The term "comprising a" should be understood as being synonymous with "comprising at least one" unless specified to the contrary.

What is claimed is:

1. A structure for fabricating a security document or a document of value, the structure comprising:
    an electronic device enabling data to be exchanged without contact;
    an inset layer made at least in part out of fiber, and having a window within which the electronic device extends, at least in part, the electronic device being fixed relative to said window;
    an adhesive layer in contact with the inset layer; and
    a removable anti-adhesive film releasably attached to the adhesive layer.

2. A structure according to claim 1, further comprising a support for the electronic device, the removable anti-adhesive film being secured to the support via an additional adhesive layer.

3. A structure for fabricating a security document or a document of value, the structure comprising:
    an electronic device enabling data to be exchanged without contact;
    an inset layer made at least in part out of fiber, and having a window within which the electronic device extends, at least in part, the electronic device being fixed relative to said window; and
    an adhesive layer in contact with the inset layer, extending only around said window of said inset layer, and not over an entire face of said inset layer.

4. A structure according to claim 3, further comprising a support for the electronic device extending only over a portion of said inset layer, and over the adhesive layer.

5. A structure according to claim 3, further comprising an additional adhesive layer extending over an entire bottom face of said inset layer and comprising a masking layer.

6. A structure for fabricating a security document or a document of value, the structure comprising:
    an electronic device enabling data to be exchanged without contact;
    an inset layer made at least in part out of fiber, and having a window within which the electronic device extends, at least in part, the electronic device being fixed relative to said window;
    an adhesive layer in contact with said inset layer;
    a support for the electronic device extending over an entire bottom face of said inset layer; and
    an antenna silkscreen printed on the support.

7. A structure for fabricating a security document or a document of value, the structure comprising:
    an electronic device enabling data to be exchanged without contact;
    an inset layer made entirely out of fiber, and having a window within which the electronic device extends, at least in part, the electronic device being fixed relative to said window;
    a wire antenna connected to the electronic device and carried by said inset layer; and
    an adhesive layer in contact with said inset layer.

8. A structure for fabricating a security document or a document of value, the structure comprising:
    an electronic device enabling data to be exchanged without contact;
    an inset layer made with at least in part out of fiber, and having a window within which the electronic device extends, at least in part, the electronic device being fixed relative to the window and the window of the said inset layer having a non-rectangular shape; and
    an adhesive layer in contact with said inset layer.

* * * * *